April 17, 1962  K. ZYSSET  3,029,851
FOOD CHOPPER
Filed Aug. 21, 1959  2 Sheets-Sheet 1
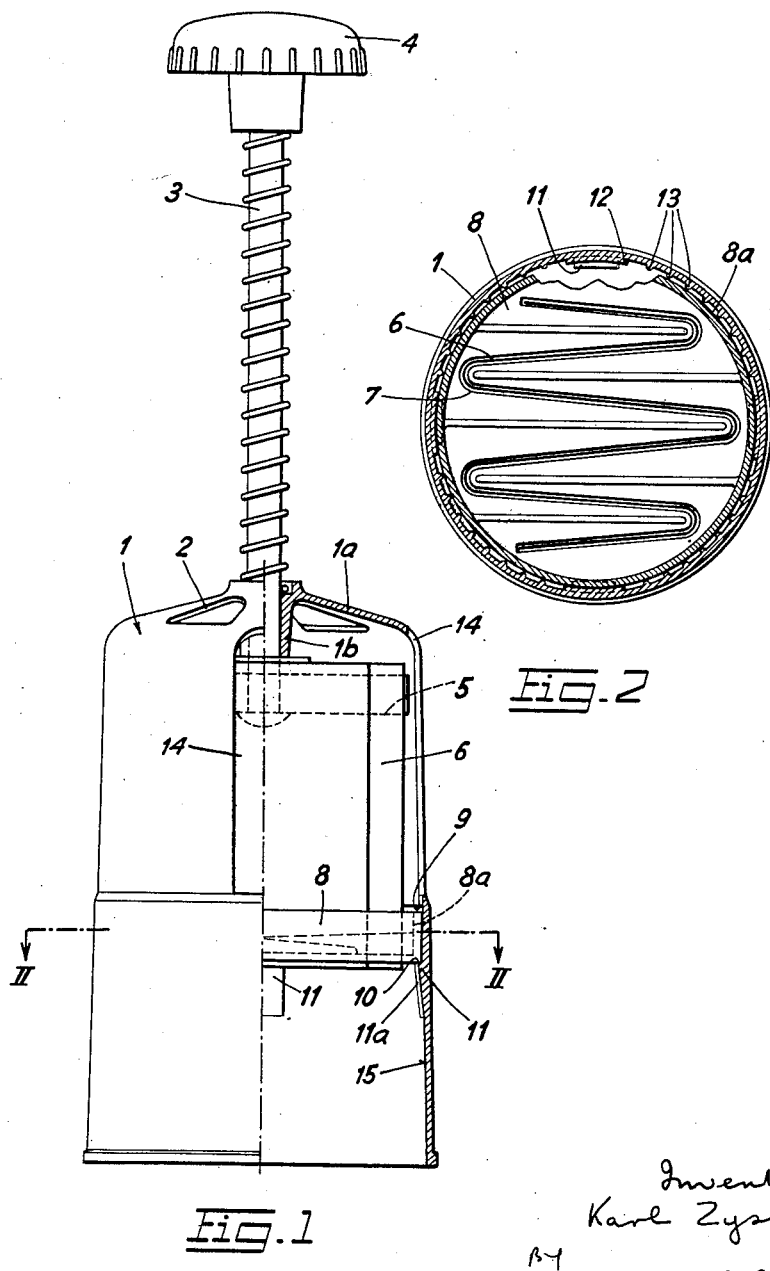
Inventor
Karl Zysset
By
Michael S. Striker
Attorney April 17, 1962
K. ZYSSET
3,029,851
FOOD CHOPPER
Filed Aug. 21, 1959
2 Sheets-Sheet 2
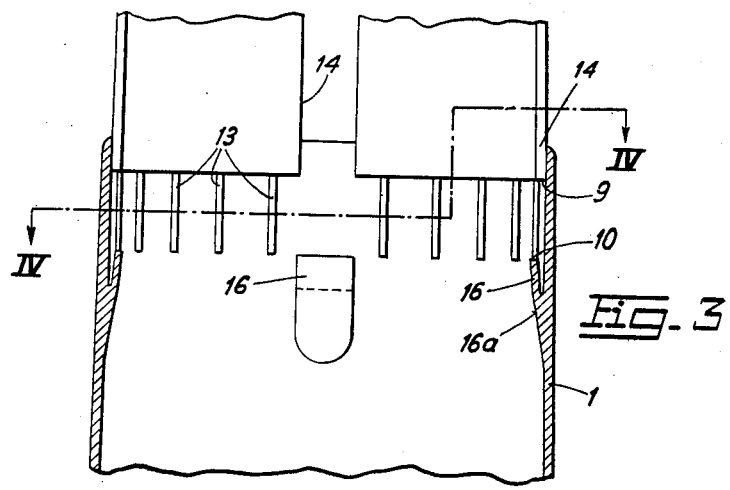
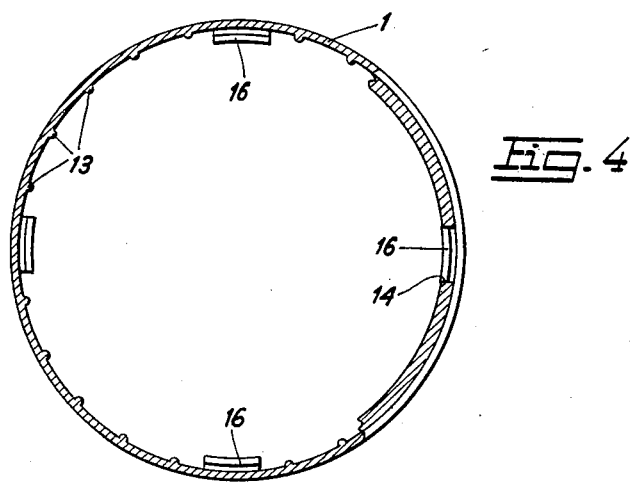
Inventor
Karl Zysset
By Michael S. Striker
Attorney

United States Patent Office 3,029,851
Patented Apr. 17, 1962

3,029,851
FOOD CHOPPER
Karl Zysset, Hauptstrasse 31, Lyss, Bern, Switzerland
Filed Aug. 21, 1959, Ser. No. 835,315
Claims priority, application Switzerland Aug. 28, 1958
5 Claims. (Cl. 146—160)

The present invention relates to a food chopper and more particularly to a food chopper comprising a bell-like housing, a cutting member or assembly and a stripper unit.

A wide variety of such food choppers are known and in use. In some of them the stripper unit is axially movable within the housing and the cutting member or assembly is arranged to take with it the stripper unit on moving upwardly. In some other food choppers supplemental means are provided to prevent any substantial motion of the stripper unit in the longitudinal direction of the apparatus.

The general object of the invention is to provide a food chopper of an improved construction which greatly reduces its cost and at the same time increases its quality.

A more specific object of the invention is to improve the construction of the housing with an aim to simplify the assembling operation of the main components.

The invention mainly contemplates the provision of a food chopper comprising a bell-like housing having at its inside a flat circular shoulder, a slipper having an upper rim adapted to rest on said circular shoulder, and having also a slit, a cutting member extending through this slit and adapted for reciprocating motion and together, with the slipper, for rotary motion within said housing, characterized in that the housing has on its inside a circular series of elevations providing further shoulders on which said slipper rests to be prevented from moving downwardly, these elevations having each an inwardly turned surface which is inwardly inclined from its lower end towards its upper end, and further characterized by a substantial resiliency of the housing and the slipper or at least one of these two parts.

Further objects and advantages of the present invention will become apparent as the following description of an illustrative embodiment of the invention and of detail modification of this embodiment proceeds, taken in conjunction with the accompanying drawings in which:

FIG. 1 is a front elevation of said embodiment, one half of the bell-like housing being shown in longitudinal section.

FIG. 2 is a cross section of this embodiment along the section line II—II of FIG. 1, a portion of the stripper being broken away to more clearly show a detail of the housing.

FIG. 3 is a longitudinal section of a portion of the housing of a modification.

FIG. 4 is a cross section of that housing along the section line IV—IV of FIG. 3.

The food chopper represented in FIGS. 1 and 2 of the drawings comprises a bell-like housing 1 the top portion 1a of which has apertures 2 and is made integral with an elongated sleeve like bearing portion 1b. A shaft 3 is mounted in this bearing portion 1b for longitudinal and rotary motion and has a handle 4 rigidly secured to its outer or top end, whilst its inner or lower end is secured to a cross bar 5 by riveting. A helical spring coaxial to the shaft 3 is inserted between the handle 4 and the portion 1b of the housing 1.

A cutting blade 6 having in cross section the shape of a serpentine as shown in FIG. 2 is rigidly secured to the cross bar 5 by conventional techniques. The lower edge of the blade is sharpened to provide a cutting edge for engaging the materials to be chopped. The blade 6 extends with substantial play through a slit 7 provided in the flat bottom of a pot like stripper 8 that has a cylindrical peripheral wall 8a. With this wall 8a the stripper 8 is held with small longitudinal play between an uninterrupted flat circular shoulder 9 of the housing 1, on the one hand, and the top surfaces 10 of four elevations 11 provided at 90° from one another at the inner surface of the housing 1, on the other hand, the top surface 10 of each such elevation 11 being parallel to the shoulder 9. The shoulder 9 is located on a plane perpendicular to the common axis of the shaft 3, housing 1 and stripper 9; the same holds true for the bottom and the top surfaces of the stripper 8 and for the set of shoulders 10. The stripper 8 is centered by four wide ribs 12 located above the elevations 11; smaller ribs 13 are moreover provided, which are slightly less prominent than the ribs 12.

It appears from the above that the construction is such that the stripper 8 cannot be removed once that it has been inserted, this being so for the sake of simplicity of handling. However, particular provision has been made in the construction of the housing 1 for rendering easy such insertion of the stripper in its place between the circular shoulder 9 and the shoulders 10 of the elevations 11, as follows:

(1) The inner surface 11a of each elevation 11 is inwardly inclined from its lower end located on the slightly conical inner surface (which might be cylindrical) of the housing, towards the top 1a.

(2) Both the housing 1 and the stripper 8 are made resilient.

(a) By the use of synthetic material having a good elasticity, as the material from which the housing 1 and the stripper 8 are conveniently obtained by pressure-moulding, and (b) By the provision of a plurality of openings 14 in the housing 1, such openings extending longitudinally from the top portion 1a to close proximity of the circular shoulder 9 and serving also the purpose of facilitating the cleaning by the user, of the inner space located above the stripper 8.

Owing to the fact that the stripper 8 is centered within the housing 1 only by the ribs 12 it is easily rotatable, as experience has shown. If these ribs 12 were not aligned on the elevations 11 it might happen that the stripper would fall from one of the shoulders 11 when the housing takes an unround cross sectional shape on being firmly held by the user.

The ribs 13, some of which then come into contact with the peripheral wall 8a of the stripper, serve the purpose of keeping the housing in approximately circular shape.

It would be possible to warrant the ease of insertion of the stripper in the housing by an enhanced resiliency of the stripper rather than by that of the housing.

The housing 1 of the modified embodiment, shown in FIGS. 3 and 4, resembles to that of the above described embodiment and is also obtained from a synthetic material by pressure-moulding, but it is distinguished therefrom by the fact that its four elevations 16, which correspond to the elevations 11, constitute, owing to their shape, upwardly projecting springy tongues. These elevations also have the inclined surface 16a corresponding to the inclined surface 11a of each of the elevations 11.

The stripper (not shown) is again in fixed axial position between the shoulders 10 provided on these elevations 16 and the flat circular shoulder 9 which is only interrupted at the openings 14. In radial direction the stripper is centered by the ribs 13, the ribs 12 being omitted because otherwise the mould would be too complicated.

The particular configuration of the elevations 16 facilitates the insertion of the stripper in its place between the shoulders 9 and 10.

I claim:

1. A food chopper comprising a one-piece housing member having an open end; a stripper member disposed in said housing member and provided with a slit; shoulder means secured to the inner surface of said housing member and engaging one side of said stripper member and preventing movement of said stripper member toward the other end of said housing member; a plurality of means engaging the other side of said stripper member and being secured to the inner surface of said housing member for preventing movement of said stripper member toward said open end of said housing member, said plurality of means each having an incline extending inwardly from the open end of said housing member toward said other end of said housing member; a cutter movably mounted in said slit in said stripper member; and a stem movably mounted at said other end of said housing member and secured to said cutter; at least one of said members being resilient, whereby said stripper member can be inserted through said open end of said housing member sliding on said incline while said resilient member yields until said stripper member is disposed between said shoulder means and said plurality of means.

2. A food chopper comprising a one-piece resilient bell-like housing member having an open end, and a neck secured to its other end; a stripper member disposed in said housing member and provided with a slit; shoulder means secured to the inner surface of said housing member and engaging said stripper member and preventing movement of said stripper member toward said other end of said housing member; a plurality of means engaging said stripper member and secured to the inner surface of said housing member and preventing movement of said stripper member toward said open end of said housing member, said plurality of means each having an incline extending inwardly from said housing member toward said other end of said housing member; a cutter movably mounted in said slit in said stripper member; and a stem movably mounted in said neck in said housing member and secured to said cutter; whereby said stripper member can be inserted through said open end of said resilient housing member sliding on said incline while said resilient housing member yields until said stripper member is disposed between said shoulder means and said plurality of means.

3. A food chopper comprising a one-piece bell-like housing member having an open end, and a neck secured to its other end; a stripper member disposed in said housing member and provided with a slit; shoulder means secured to the inner surface of said housing member and engaging said stripper member and preventing movement of said stripper member toward said other end of said housing member; a plurality of means engaging said stripper member and secured to the inner surface of said housing member and preventing movement of said stripper member toward the open end of said housing member, said plurality of means each having an incline extending inwardly from the larger end of said housing member toward said other end of said housing member; a plurality of spaced ribs extending longitudinally of said housing member and disposed between said shoulder means and said plurality of means and in alignment with said plurality of means and centering said stripper member on portions of its periphery; a cutter movably mounted in said slit in said stripper member; a stem movably mounted in said neck on said housing member and secured to said cutter; at least one of said members being resilient, whereby said stripper member can be inserted through the open larger end of said housing member sliding on said inclines while said resilient member yields until said stripper member is disposed between said shoulder means and said plurality of means.

4. A food chopper comprising a one-piece bell-like housing member having an open end, and a neck secured to its other end; a stripper member disposed in said housing member and provided with a slit; shoulder means secured to the inner surface of said housing member and engaging said stripper member and preventing movement of said stripper member toward said other end of said housing member; a plurality of spaced resilient tongues secured to the inner surface of said housing member and projecting inwardly of said housing member toward said other end of said housing member and engaging said stripper member and preventing movement of said stripper member toward the open end of said housing member; a cutter movably mounted in said slit in said stripper member; and a stem movably mounted in said neck on said housing member and secured to said cutter whereby said stripper member can be inserted through the open end of said housing member sliding on said resilient tongues and moving them toward said housing member until said stripper member is disposed between said shoulder means and said resilient tongues.

5. A food chopper comprising a one-piece resilient bell-like housing having an open end, and another end; a resilient stripper member disposed in said housing member and provided with a slit; shoulder means secured to the inner surface of said housing member and engaging said stripper member and preventing movement of said stripper member toward said other end of said housing member; a plurality of means engaging said stripper member and secured to the inner surface of said housing member and preventing movement of said stripper member toward the open end of said housing member, said plurality of means each having an incline extending inwardly from said housing member toward said other end of said housing member; a cutter movably mounted in said slit in said stripper member; and a stem movably mounted at said other end of said housing member and secured to said stripper member whereby said stripper member can be inserted through the open end of said housing member sliding on said incline while said housing member and stripper member yield until said stripper member is disposed between said shoulder means and said plurality of means.

References Cited in the file of this patent

UNITED STATES PATENTS 2,782,826    Zysset _____ Feb. 26, 1957